United States Patent
Seoung

[19]
[11] Patent Number: 6,021,014
[45] Date of Patent: Feb. 1, 2000

[54] METHOD FOR GENERATING HEAD SWITCHING SIGNALS IN VIDEO CASSETTE RECORDER USING HEAD DRUM PULSE AND VIDEO TAPE ENVELOPE SIGNALS AND APPARATUS THEREFOR

[75] Inventor: Gan-soo Seoung, Seoul, Rep. of Korea

[73] Assignee: Samsung Electronics Co., Ltd., Kyungki-do, Rep. of Korea

[21] Appl. No.: 08/674,902

[22] Filed: Jul. 3, 1996

[30] Foreign Application Priority Data

Jul. 5, 1995 [KR] Rep. of Korea ............... 95-19634

[51] Int. Cl.$^7$ ................................. G11B 15/14
[52] U.S. Cl. ................. 360/64; 360/70; 386/46; 386/51
[58] Field of Search ................. 360/64, 70, 77.15, 360/77.13, 73.04, 72.3, 31, 51, 52; 318/6, 569; 386/27, 33, 47, 72, 76, 69, 46, 113, 21

[56] References Cited

U.S. PATENT DOCUMENTS

| | | | |
|---|---|---|---|
| 4,752,839 | 6/1988 | Lovely | 360/64 X |
| 5,251,079 | 10/1993 | Yamada et al. | 360/77.14 |
| 5,291,342 | 3/1994 | Kim | 386/72 |
| 5,448,367 | 9/1995 | Park et al. | 360/70 X |
| 5,539,589 | 7/1996 | Yamamoto | 386/72 X |
| 5,663,623 | 9/1997 | Seoung | 318/569 |

*Primary Examiner*—Aristotelis M. Psitos
*Assistant Examiner*—Patrick Wamsley
*Attorney, Agent, or Firm*—Sughrue, Mion, Zinn, Macpeak & Seas, PLLC

[57] ABSTRACT

A head switching signal generation apparatus for a VCR includes a pulse signal generator for generating a first pulse signal having the same phase and period of time as a head drum pulse signal in response to the head drum pulse signal, an envelope detector for detecting an envelope signal from a signal read out from a video tape and generating a second pulse signal having the same phase and period of time as the detected envelope signal, and a controller for generating a head switching signal whose pulse level is altered at an actual head switching point of time, based on the received first and second pulse signals. An accurate head switching signal can be generated even when a vertical sync signal is not detected from a video tape having a recording format for recording a vertical sync signal, as well as a recording format by which a vertical sync signal is not recorded on a video tape.

17 Claims, 6 Drawing Sheets

FIG. 4B PLS1

FIG. 4C PLS2

METHOD FOR GENERATING HEAD SWITCHING SIGNALS IN VIDEO CASSETTE RECORDER USING HEAD DRUM PULSE AND VIDEO TAPE ENVELOPE SIGNALS AND APPARATUS THEREFOR

BACKGROUND OF THE INVENTION

The present invention relates to a method for generating a head switching signal in a video cassette recorder and an apparatus therefor, and more particularly, to a method for generating a head switching signal in a video cassette recorder and an apparatus therefor, in which the head switching signal is accurately generated even though a vertical sync signal is not detected from a reproduction signal from a video tape.

Recently, video cassette recorders (VCRs) have become compact and light and at the same time a head drum is being rapidly miniaturized. As a result, it has been difficult to accurately control the position of a video head with respect to a pulse generator (PG) signal on a head drum. Thus, it is required that a phase be precisely controlled for each deck. To automatically do so, U.S. Pat. No. 5,357,382 issued on Oct. 18, 1994 proposed an apparatus and method for automatically controlling a head switching position by using a vertical sync signal in a VCR. Referring to FIGS. 1 and 2A through 2D, the technology of the above U.S. patent will be briefly described.

Figure 1:
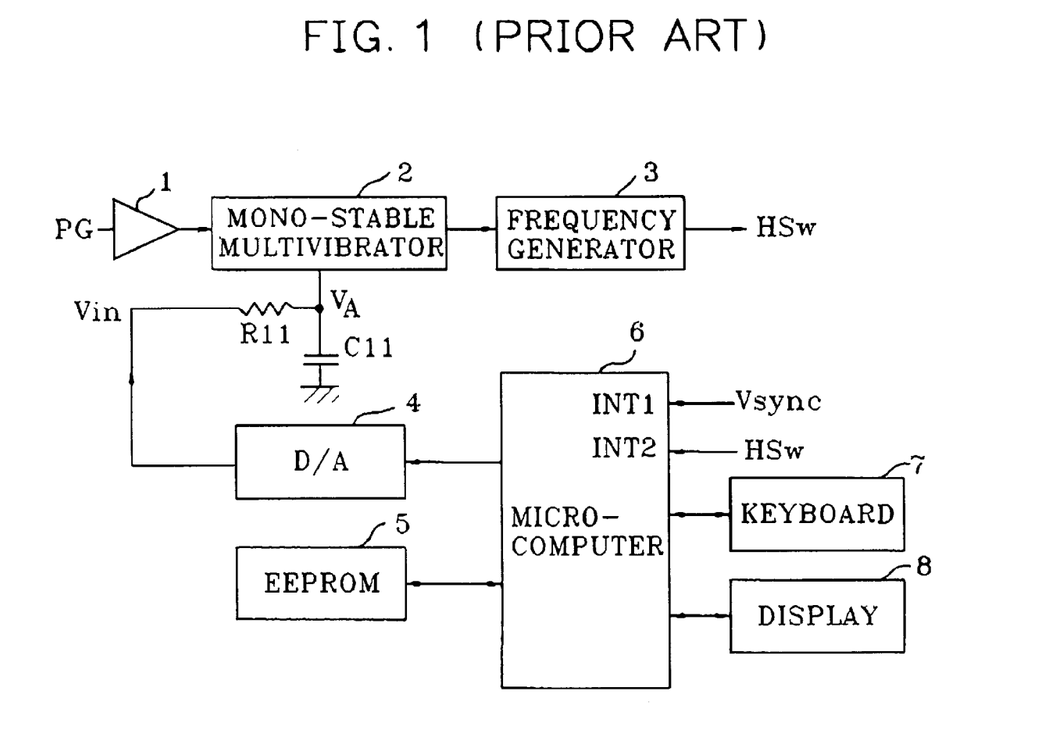
FIG. 1 is a block diagram of a conventional apparatus for automatically controlling a head switching point for a VCR.
Figure 2A:
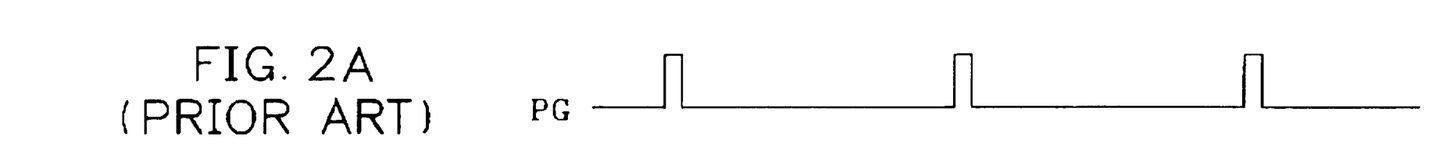
FIGS. 2A through 2D are waveform diagrams of respective portions of the FIG. 1 apparatus.
Figure 2B:
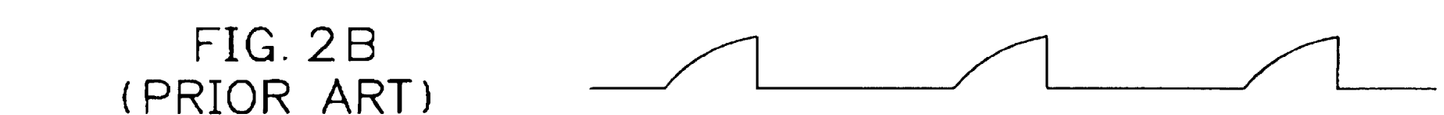
Figure 2C:
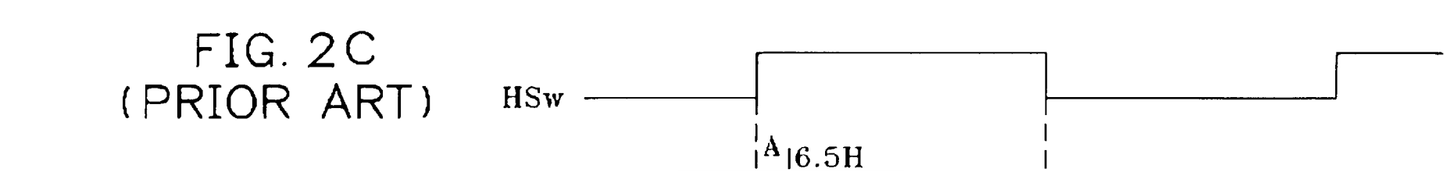
Figure 2D:
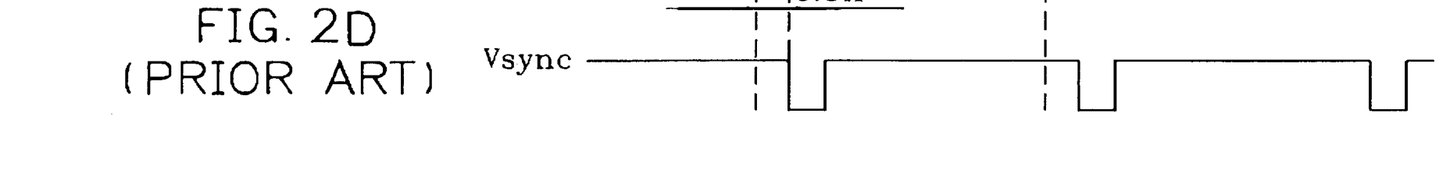

An amplifier 1 of FIG. 1 receives a drum pulse signal PG of FIG. 2A from a head drum (not shown), amplifies the received drum pulse signal PG by a predetermined amount of amplification, and applies the amplified pulse signal to a mono-stable multivibrator 2 as a trigger signal of FIG. 2B. The mono-stable multivibrator 2 is triggered at an edge of the amplified pulse signal output from the amplifier 1 to thereby output a pulse signal delayed by a time constant determined by a resistor R11 and a capacitor C11. A frequency generator 3 generates a frequency signal of 30 Hz which is output as a head switching signal HSw of FIG. 2C. A microcomputer 6 includes an input end INT1 for receiving a vertical sync signal Vsync of FIG. 2D and an input end INT2 for a head switching signal HSw, and judges whether the vertical sync signal Vsync is received at the point of time lagging 6.5H, that is, 412 $\mu$sec from an edge of the head switching signal HSw. Here, H represents a horizontal sync period. In other words, the microcomputer 6 judges whether or not an interval "A" between an edge position of the head switching signal HSw and a falling edge of the vertical sync signal Vsync corresponds to 6.5H. The digital delay data obtained by such a judgement of the microcomputer 6 is converted into analog data in a digital-to-analog converter 4. The obtained voltage Vin is altered into a voltage $V_A$ by the resistor R11 and the capacitor C11. The voltage $V_A$ alters the time constant of the mono-stable multivibrator 2. Accordingly, the mono-stable multivibrator 2 delays the output signal of the amplifier 1 by the amount corresponding to the altered time constant, and outputs the delayed result. The delayed signal is output as a head switching signal HSw of 30 Hz by the frequency generator 3. The microcomputer 6 stores the delayed data in an EEPROM 5 if the interval "A" between the vertical sync signal and the head switching signal of 30 Hz is 6.5H, and reads out the stored data as necessary to output the delayed data. Accordingly, an accurate head switching signal HSw can be output.

However, since a digital recording-type VCR such as a standard definition digital VCR does not record a vertical sync signal on a video tape but uses a predetermined track pattern, an accurate head switching signal cannot be obtained using the technology disclosed in the above-described patent. Even though a vertical sync signal is recorded on a video tape, if an interval between a head switching signal and the vertical sync signal is beyond a predetermined value, for example, 6.5H, an accurate head switching signal cannot be output.

SUMMARY OF THE INVENTION

To solve the above problem, it is an object of the present invention to provide a head switching signal generation method for a VCR, which can generate a head switching signal even though there is no vertical sync signal.

It is another object of the present invention to provide a head switching signal generation apparatus for a VCR, which can generate a head switching signal even though there is no vertical sync signal.

To accomplish the above object of the present invention, there is provided a head switching signal generation method for a video cassette recorder (VCR), the method comprising the steps of:

(a) generating a first pulse signal having the same phase and period of time as a head drum pulse signal in response to the head drum pulse signal and a head drum frequency signal;

(b) detecting an envelope signal from a signal read out from a video tape and generating a second pulse signal having the same phase and period of time as the detected envelope signal; and (c) generating a head switching signal whose pulse level is altered at an actual head switching point of time, in response to said first and second pulse signals.

According to another aspect of the present invention, there is also provided a head switching signal generation apparatus for a video cassette recorder (VCR), said apparatus comprising:

pulse signal generation means for generating a first pulse signal having the same phase and period of time as a head drum pulse signal in response to the head drum pulse signal and a head drum frequency signal; envelope detection means for detecting an envelope signal from a signal read out from a video tape and generating a second pulse signal having the same phase and period of time as the detected envelope signal; and control means for receiving said first and second pulse signals and generating a head switching signal whose pulse level is altered at an actual head switching point of time, based on said received first and second pulse signals.

According to the above object of the present invention, there is provided a head switching signal generation apparatus for another video cassette recorder (VCR), said apparatus comprising:

a counter for counting a head drum pulse signal and outputting counted values; a register for storing and outputting the counted values output from said counter; a comparison/output unit for comparing the counted value output from said counter with the values stored in said register, and for outputting a head switching signal based on the result of comparison; an envelope detector for detecting an envelope signal from a signal read out from a video tape, and generating a pulse signal having the same period of time and phase as the detected envelope signal; and a controller for controlling said register, in response to the pulse signal of said envelope detector, to store the counted values output from said counter at the points of time when corresponding to the pulse edge of the pulse signal.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the drawings.

Figure 3:
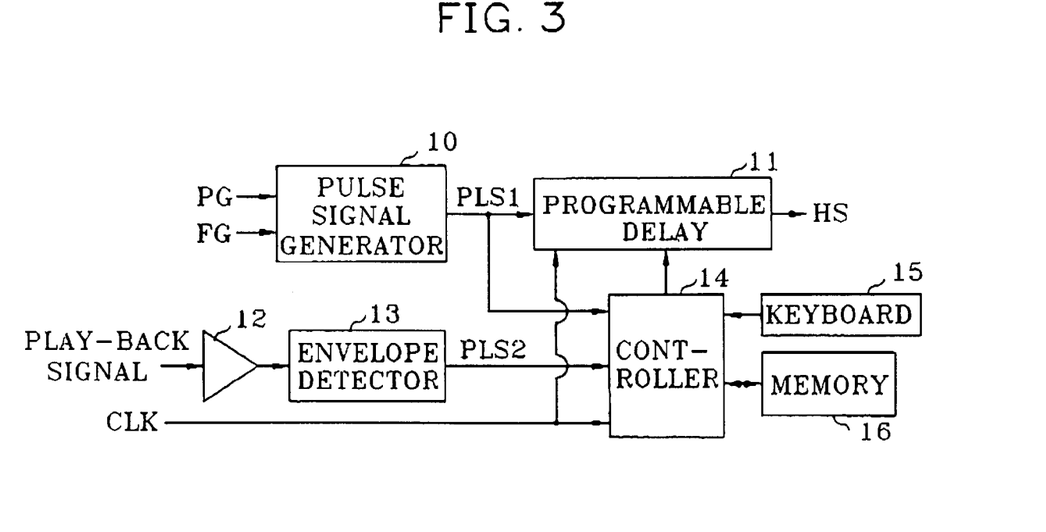
FIG. 3 is a block diagram of a head switching generation apparatus for a digital VCR according to one embodiment of the present invention.

FIG. 3 is a block diagram of a head switching generation apparatus for a digital VCR according to one embodiment of the present invention. FIGS. 4A through 4D are waveform diagrams of respective portions of the FIG. 3 apparatus.

Figure 4A:
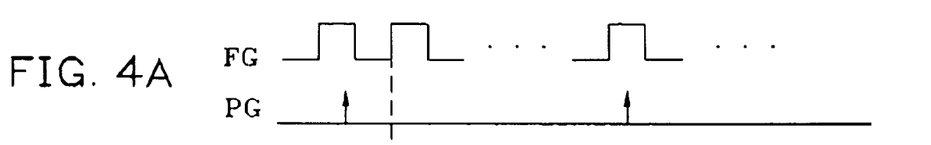
FIGS. 4A through 4D are waveform diagrams of respective portions of the FIG. 3 apparatus.
Figure 4B:
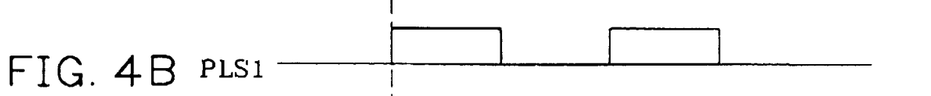
Figure 4C:
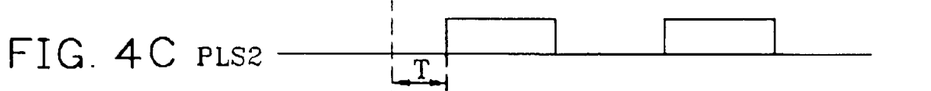
Figure 4D:
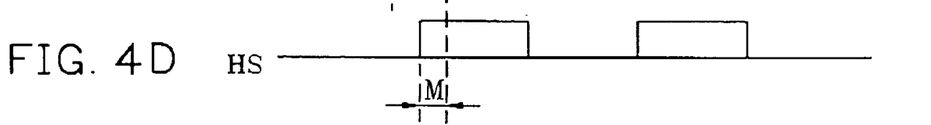

In FIG. 3, a block diagram of a VCR system having two heads is shown, and a pulse signal generator 10 receives a drum pulse signal PG and a drum frequency signal FG shown in FIG. 4A both of which are generated by a head drum (not shown), and generates a first pulse signal PLS1 of FIG. 4B.

The pulse signal generator 10 in this embodiment outputs the first pulse signal PLS1 having the same period of time and phase as the drum pulse signal PG. The first pulse signal PLS1 is applied to a programmable delay 11 and a controller 14. An amplifier 12 amplifies a signal read out from a video tape (not shown) by a video head (not shown) by a predetermined level, and the amplified signal is applied to an envelope detector 13. The envelope detector 13 detects an envelope signal from the amplified signal and generates a second pulse signal PLS2 having the same period of time and phase as intervals between starting points of time at which the envelope signal is detected. The second pulse signal PLS2 is applied to the controller 14. The controller 14 receives the second pulse signal PLS2 of the envelope detector 13 and the first pulse signal PLS1 of the pulse signal generator 10, and generates a delay value T–M based on the count of the number of the pulses of the system clock CLK. The delay 11 receiving the system clock CLK delays the first pulse signal PLS1 received from the pulse signal generator 10 according to the delay value output from the controller 14. A thus-obtained head switching signal HS is used for head switching of video heads (not shown). A keyboard 15 is used as an input unit for inputting user commands. A memory 16 is comprised of an EEPROM which is used for storing a delay value T–M generated by the controller 14 and information relating to the control of the controller 14. The operation of the FIG. 3 apparatus will be described with reference to FIGS. 4A–4D and 5.

Figure 5A:
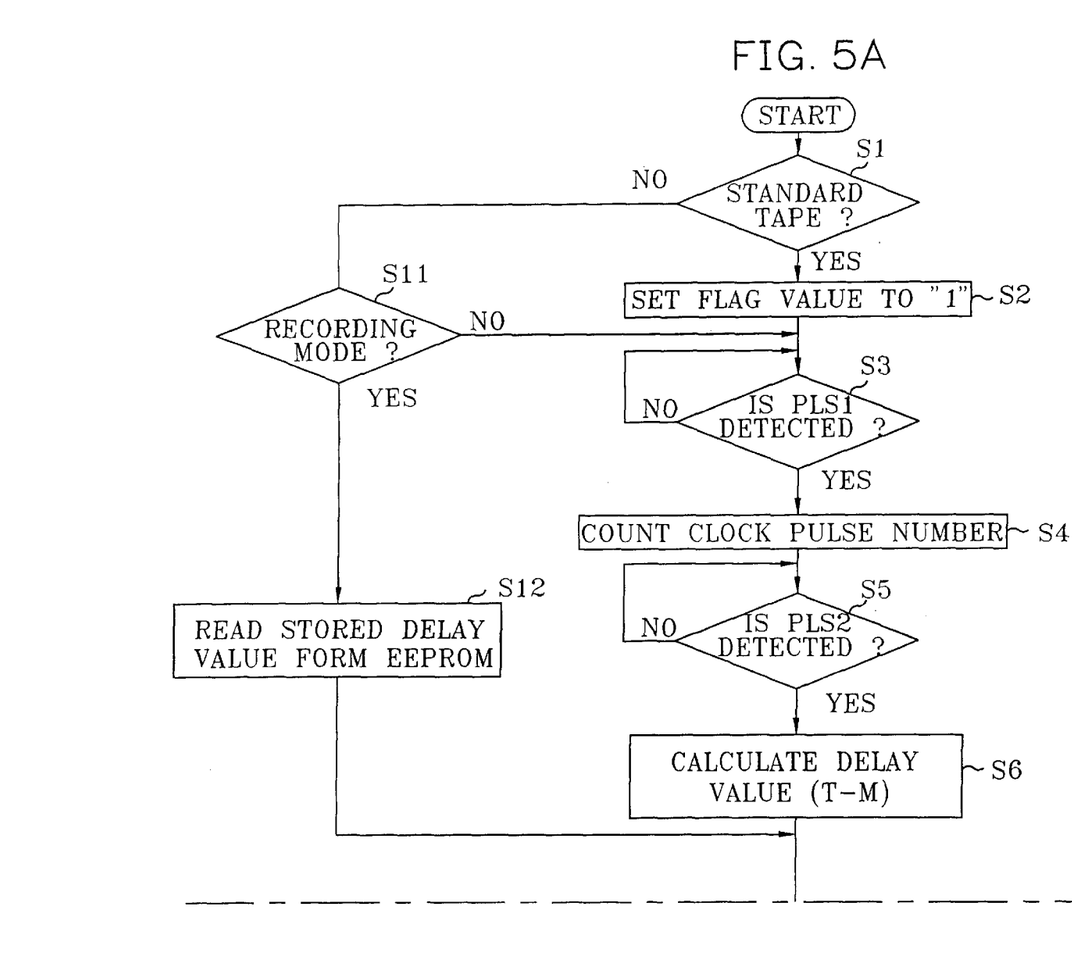
FIGS. 5A and 5B are flowchart diagrams for explaining the generation of a head switching signal in the FIG. 3 apparatus.

If the FIG. 3 apparatus starts to operate, the controller 14 receives a signal indicating whether a standard tape is loaded into a deck (not shown) from keyboard 15 and judges whether the video tape loaded into the deck is a standard tape according to a standard definition of a standard definition digital VCR based on the received signal in step S1.

Figure 5B:
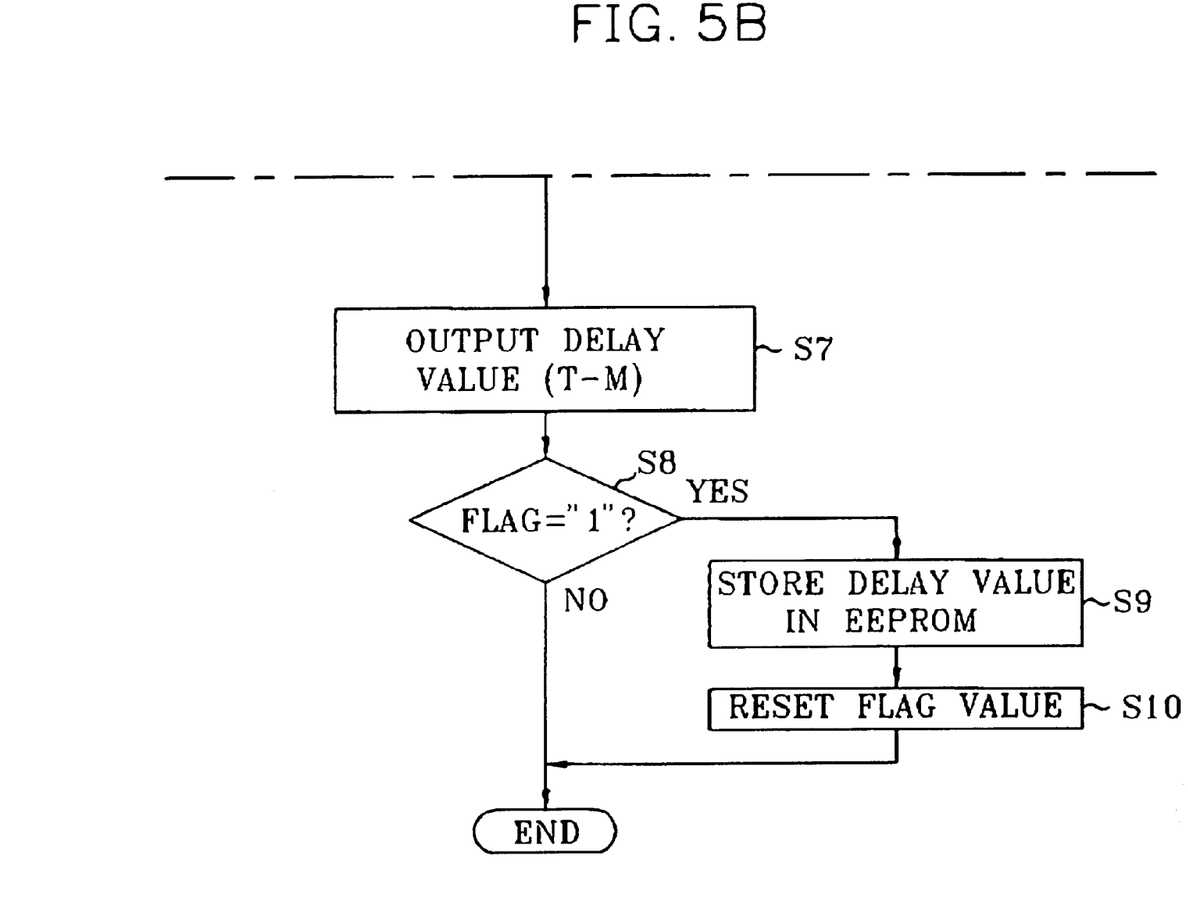

Here, the standard tape is a tape for recording a signal according to a particular recording format. The standard tape is used for testing the functions of VCRs with respect to a video tape during mass-production. In case that a standard tape has been loaded, the controller 14 sets the value of a flag relative to a head switching control as "1" in step S2. Then, the controller 14 judges whether the edge of the first pulse signal PLS1 applied from the pulse signal generator 10 is detected in step S3. If the edge of the first pulse signal PLS1 output from the pulse signal generator 10 is detected in step S3, the controller 14 initializes an internal counter (not shown), which counts up the number of the pulses of the system clock CLK input from a point of time of detecting the edge of the first pulse signal PLS1 to then output the counted value T in step S4. The controller 14 judges whether the edge of the second pulse signal PLS2 output from the envelope detector 13 is detected in step S4. If the edge of the second pulse signal PLS2 is detected, the controller 14 calculates the delay value T–M which is a difference value between the value counted in step S4 and a predetermined value M. Here, a symbol M means an interval between the edges of the second pulse signal PLS2 and the actual head switching signal HS. The controller 14 outputs the delay value T–M calculated in step S6 to the delay 11, and judges whether the value of the flag is "1" in step S8. If the value of the flag is "1," the controller 14 stores the calculated delay value T–M in the memory 16 in step S9. Then, the controller 14 resets the value of the flag into "0" in step S10.

Meanwhile, if the video tape loaded in the deck in step S1 is not a standard tape, that is, a normal tape for a user's general use, the controller 14 judges whether a current operating mode is a recording mode. Here, setting of a recording mode or a play-back mode is accomplished by user commands via the keyboard 15. If a current operating mode is a play-back mode, the controller 14 performs operations of the steps following step S3. Meanwhile, if a current operating mode is a recording mode, the controller 14 reads the delay value T–M stored in the memory 16, and the read delay value T–M is supplied to the delay 11 in step S7. If the value of the flag is not "1" in step S8, the controller 14 completes the above-described processes.

The memory 16 continues to store the delay value T–M even though the power is not supplied thereto. Accordingly, if the delay value T–M is stored in the memory 16 during mass-production, the user can output a desired head switching signal HS without requiring a particular head switching control. If the VCR is provided with a funtion of generating the above head switching signal HS, and a step of judging whether a standard tape is loaded is changed to a step of controlling the head switching signal, a user can control the generation of a head switching signal HS when the head switching signal based on a predetermined delay value T–M for mass-production does not match the track pattern of a currently loaded tape.

Figure 6:
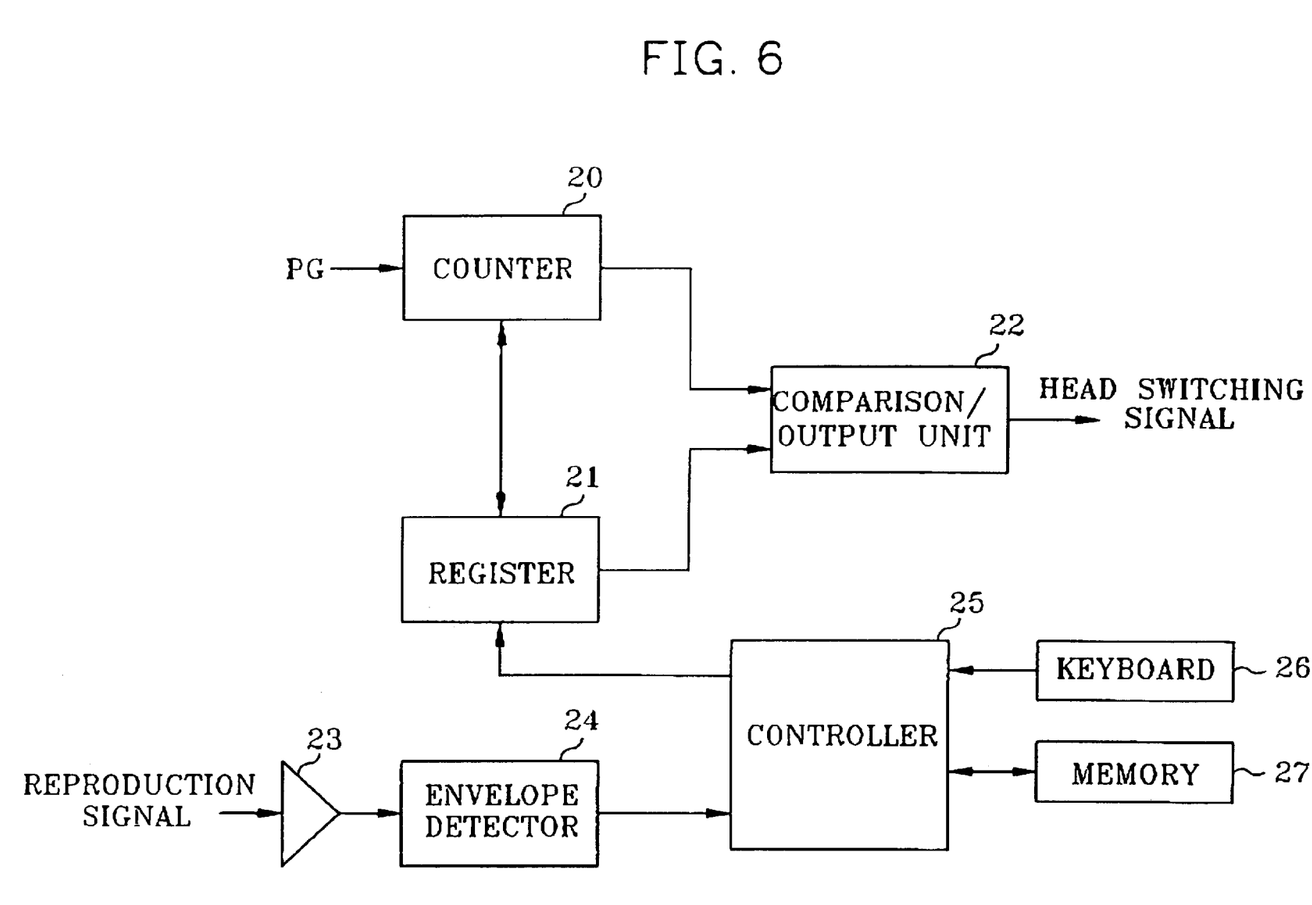
FIG. 6 is a block diagram of a head switching generation apparatus for a digital VCR according to another embodiment of the present invention.

FIG. 6 is a block diagram of a head switching generation apparatus for a digital VCR according to another embodiment of the present invention. Unlike that of FIG. 3 described above, the apparatus of FIG. 6, which can determine the width of a head switching signal, is suitable to the use of a plurality of reproduction heads. Referring to FIG. 6, a counter 20 counts up the pulses of the system clock CLK from a point of time when the head drum pulse signal PG is applied thereto, and then outputs the counted value to a register 21 and a comparison/output unit 22. The register 21 stores the counted value applied from the counter 20 according to a control signal of a controller 25. An envelope detector 24, which receives a signal read out from a video tape via an amplifier 23, detects an envelope signal from the amplified signal and generates a third pulse signal PLS3 having the same period of time and phase as the detected envelope signal. The controller 25 controls the register 21 to store the output value of the counter 20, and allows the counted value stored in the register 21 to be memorized in a memory 27 composed of an EEPROM. The controller 25 controls the operation of the register 21 and the comparison/output unit 22 according to operator's key input via a keyboard 26.

Firstly, in case that the apparatus of FIG. 6 determines a pulse interval of the head switching signal according to the user's key input via the keyboard 26, the register 21, which receives the counted value from the counter 20, stores the counted value applied according to the control signal of the controller 25. The controller 25 controls the register 21 to store the counted values supplied from the counter 20 at the point of time corresponding to a rising edge and a falling edge of the third pulse signal PLS3 from the envelope detector 24. Hereinafter, "a first counted value" refers to a counted value from the point of time when the head drum pulse signal PG is applied to the point of time when the rising edge of the third pulse signal PLS3 is applied, and "a second counted value" refers to a counted value from the point of time when the head drum pulse signal PG is applied to the time when the falling edge of the third pulse signal PLS3 is applied. When the register 21 stores two counted values, the controller 25 controls the memory 27 to memorize the counted values stored in the register 21.

Meanwhile, the comparison/output unit 22, which receives the counted value output from the counter 20, compares the counted values stored in the register 21 with the counted value output from the counter 20, and then generates a head switching signal HS1 having a pulse interval between the point of time when the output value of the counter 20 matches the first counted value of the register 21 and the point of time when the output value of the counter 20 matches the second counted value of the register 21. Generation of such a head switching signal HS1 is suitable to the case that a head switching signal having the same phase and period of time as an envelope signal is required. However, in the case that a head switching signal having a different phase and period of time from an envelope signal is necessary, the controller 25 alters the first and second counted values stored in the register 21 into a value suitable to a corresponding recording format of the VCR.

After a pulse interval of the head switching signal is determined, the comparison/output unit 22 can generate the head switching signal on the basis of points of time when the two values stored in the register 21 are equal to the counted value output from the counter 20.

As described above, the present invention can generate an accurate head switching signal even when a vertical sync signal is not detected from a video tape having a recording format for recording a vertical sync signal, as well as a recording format by which a vertical sync signal is not recorded on a video tape.

While only certain embodiments of the invention have been specifically described herein, it will apparent that numerous modifications may be made thereto without departing from the spirit and scope of the invention.

What is claimed is:

1. A head switching signal generation method for a video cassette recorder (VCR), said method comprising the steps of:
    (a) generating a first pulse signal having the same phase and period of time as a head drum pulse signal in response to the head drum pulse signal and a head drum frequency signal;
    (b) detecting an envelope signal from a signal read out from a video tape and generating a second pulse signal having the same phase and period of time as the detected envelope signal; and
    (c) generating a head switching signal whose pulse level is altered at an actual head switching point of time, in response to said first and second pulse signals.

2. The head switching signal generation method for a VCR according to claim 1, wherein said step (c) comprises the steps of:
    (c1) counting a number of system clock pulses for an interval of time from an edge position of said first pulse signal to an edge position of said second pulse signal to thereby output a counted value;
    (c2) calculating a delay value based on a difference between the counted value of said step (c1) and a predetermined value; and
    (c3) delaying said first pulse signal according to the delay value of said step (c2) to thereby output the delayed first pulse signal as a head switching signal.

3. The head switching signal generation method for a VCR according to claim 2, wherein said step (c1) comprises the steps of:
    (ca1) judging whether a standard tape for testing the function of a VCR relative to a video tape is loaded in a deck;
    (ca2) detecting the edge of the first pulse signal when it is judged that a standard tape is loaded in said step (ca1);
    (ca3) counting the number of the pulses of the system clock from a point of time of error detection in response to the edge detection of said step (ca2);
    (ca4) detecting the edge of the second pulse signal of said step (b); and
    (ca5) outputting the counted value of said step (ca3) in response to the edge detection of said step (ca4).

4. The head switching signal generation method for a VCR according to claim 2, wherein said predetermined value is a value of an interval of time between the edge position of the envelope signal and the actual head switching signal.

5. The head switching signal generation method for a VCR according to claim 2, further comprising a step of storing the delay value of said step (c) in a memory.

6. A head switching signal generation apparatus for a video cassette recorder (VCR), said apparatus comprising:
    pulse signal generation means for generating a first pulse signal having the same phase and period of time as a head drum pulse signal in response to the head drum pulse signal and a head drum frequency signal;
    envelope detection means for detecting an envelope signal from a signal read out from a video tape and generating a second pulse signal having the same phase and period of time as the detected envelope signal; and
    control means for receiving said first and second pulse signals and generating a head switching signal whose pulse level is altered at an actual head switching point of time, based on said received first and second pulse signals.

7. The head switching signal generation apparatus for a VCR according to claim 6, wherein said control means comprises a controller for receiving the first pulse signal output from said pulse signal generation means and the second pulse signal output from said envelope detection means and generating a delay value based on an interval between the edge positions of the first pulse signal and the second pulse signal and a predetermined value; and a delay for delaying said first pulse signal according to the delay value output by said controller and outputting the head switching signal obtained as a result of delaying the first pulse signal.

8. The head switching signal generation apparatus for a VCR according to claim 7, wherein said control means further comprises a counter for counting a number of system clock pulses from a point of time when the first pulse signal of said pulse signal generation means is applied to said counting means and outputting the counted value, wherein said delay value is determined based on a difference between the counted value of said counter and a predetermined value at the point of time when the second pulse signal of said envelope detection means is applied to said controller.

9. The head switching signal generation apparatus for a VCR according to claim 7, wherein said predetermined value is a value of an interval of time between the edge position of the envelope signal and a time when the pulse level of the head switching signal is altered.

10. The head switching signal generation apparatus for a VCR according to claim 7, further comprising a memory for storing said delay value.

11. A head switching signal generation apparatus for a video cassette recorder (VCR), said apparatus comprising:

a counter for counting a head drum pulse signal and outputting counted values;

a register for storing and outputting selected ones of the counted values output from said counter;

a comparison/output unit for comparing the counted values output from said counter with the selected ones of the counted values stored in said register, and for outputting a head switching signal based on a result of the comparison;

an envelope detector for detecting an envelope signal from a signal read out from a video tape, and generating a pulse signal having the same period of time and phase as the detected envelope signal; and a controller for controlling said register in response to the pulse signal of said envelope detector to store the selected ones of the counted values output from said counter at points of time which correspond to respective pulse edges of the pulse signal.

12. The head switching signal generation apparatus for a VCR according to claim 11, wherein said controller alters a magnitude of the selected ones of the counted values stored in said register according to a recording format of the VCR.

13. The head switching signal generation apparatus for a VCR according to claim 11, further comprising a non-volatile memory for memorizing the selected ones of the counted values stored in said register.

14. A head switching signal generation method for a video cassette recorder (VCR), said method comprising the steps of:

(a) generating a first pulse signal in response to a head drum pulse signal and a head drum frequency signal;

(b) detecting an envelope signal from a signal read out from a video tape and generating a second pulse signal in response to the detected envelope signal; and (c) generating a head switching signal in response to said first and second pulse signals.

15. A head switching signal generation apparatus for a video cassette recorder (VCR), said apparatus comprising:

pulse signal generation means for generating a first pulse in response to the head drum pulse signal and a head drum frequency signal;

envelope detection means for detecting an envelope signal from a signal read out from a video tape and generating a second pulse signal in response to the detected envelope signal; and control means for receiving said first and second pulse signals and generating a head switching signal whose pulse level is altered at an actual head switching point of time, based on said received first and second pulse signals.

16. A head switching signal generation method for a video cassette recorder (VCR), said method comprising the steps of:

(a) generating a first pulse signal in response to a head drum pulse signal and a head drum frequency signal;

(b) detecting an envelope signal from a signal read out from a video tape and generating a second pulse signal in response to the detected envelope signal;

(c) calculating a time difference between a starting time of the first pulse and a starting time of the second pulse;

(d) subtracting a predetermined time value from the calculated time difference to determine a switching time; and (e) generating a head switching signal having a starting time which coincides with the switching time determined in step (d).

17. A head switching signal generation apparatus for a video cassette recorder (VCR), said apparatus comprising:

pulse signal generation means for generating a first pulse in response to the head drum pulse signal and a head drum frequency signal;

envelope detection means for detecting an envelope signal from a signal read out from a video tape and generating a second pulse signal in response to the detected envelope signal; and control means for receiving said first pulse and said second pulse, calculating a time difference between a starting time of said first pulse and a starting time of said second pulse, subtracting a predetermined time value from the calculated time difference to determine a switching time, and generating a head switching signal having a starting time which coincides with the switching time.

* * * * *